United States Patent
Bradshaw et al.

(10) Patent No.: US 8,414,835 B2
(45) Date of Patent: Apr. 9, 2013

(54) OXYGEN STORAGE COMPONENT

(75) Inventors: Heather Bradshaw, Swinton (GB); Colin Norman, Swinton (GB)

(73) Assignee: Magnesium Elektron Limited, Salford Quays (GB)

(*) Notice: Subject to any disclaimer, the term of this patent is extended or adjusted under 35 U.S.C. 154(b) by 0 days.

(21) Appl. No.: 12/301,044

(22) PCT Filed: May 17, 2007

(86) PCT No.: PCT/GB2007/001837
§ 371 (c)(1),
(2), (4) Date: Mar. 9, 2009

(87) PCT Pub. No.: WO2007/132253
PCT Pub. Date: Nov. 22, 2007

(65) Prior Publication Data
US 2009/0185961 A1   Jul. 23, 2009

(30) Foreign Application Priority Data
May 17, 2006   (GB) .................................. 0609783.6

(51) Int. Cl.
B01J 23/00 (2006.01)
B01J 23/10 (2006.01)
B01D 50/00 (2006.01)
B01D 53/34 (2006.01)
F01N 3/00 (2006.01)
F23J 11/00 (2006.01)

(52) U.S. Cl.
USPC ........... 422/168; 502/302; 502/303; 502/304; 502/349; 502/352

(58) Field of Classification Search .......... 502/302–304, 502/349, 352; 422/168
See application file for complete search history.

(56) References Cited

U.S. PATENT DOCUMENTS

| 5,712,218 A | * | 1/1998 | Chopin et al. ................. 502/304 |
| 5,908,800 A | * | 6/1999 | Bonneau et al. ............... 501/103 |
| 5,928,619 A | | 7/1999 | Bonneau et al. |
| 6,150,299 A | * | 11/2000 | Umemoto et al. ............ 502/304 |

(Continued)

FOREIGN PATENT DOCUMENTS

| JP | 2002-336703 A | 11/2002 |
| WO | 03/004154 A1 | 1/2003 |

(Continued)

OTHER PUBLICATIONS

International Search Report, dated Oct. 15, 2007.

(Continued)

*Primary Examiner* — Cam N. Nguyen
(74) *Attorney, Agent, or Firm* — Pearne & Gordon LLP

(57) ABSTRACT

The present invention relates to oxygen storage components for catalytic converters for automobile exhaust systems, particularly for those with petrol-driven engines. In accordance with the present invention there is provided a ceria containing mixed oxide suitable as an oxygen storage material having a ceria content in the range 10 to 80% by weight and at least one metal oxide in an amount of less than 0.5% by weight, wherein the metal is selected from the first row transition elements and the group IVB elements of the periodic table. The inventions also provides an oxygen storage material for catalytic converters for automobile exhaust systems comprising an oxide of the present invention.

7 Claims, 3 Drawing Sheets

U.S. PATENT DOCUMENTS

Figure 1:
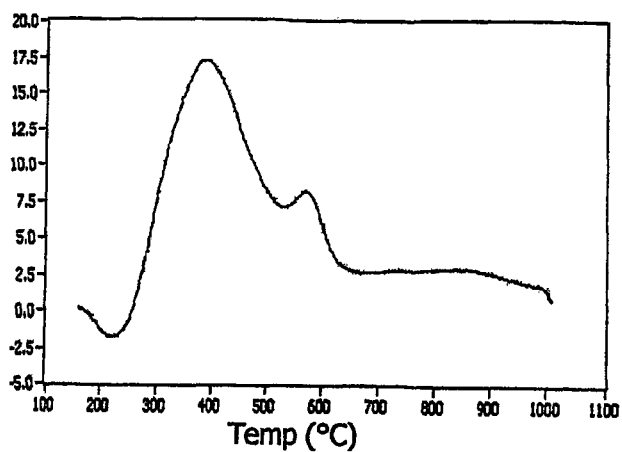

| | | | |
|---|---|---|---|
| 6,171,572 B1* | 1/2001 | Aozasa | 423/594.12 |
| 6,255,242 B1* | 7/2001 | Umemoto et al. | 501/103 |
| 6,294,140 B1* | 9/2001 | Mussmann et al. | 423/213.5 |
| 6,348,430 B1* | 2/2002 | Lindner et al. | 502/304 |
| 6,350,421 B1* | 2/2002 | Strehlau et al. | 423/213.2 |
| 6,506,705 B2* | 1/2003 | Blanchard et al. | 502/300 |
| 6,528,451 B2* | 3/2003 | Brezny et al. | 502/304 |
| 6,605,565 B1* | 8/2003 | Zhang et al. | 502/304 |
| 6,893,998 B2* | 5/2005 | Shigapov et al. | 502/327 |
| 7,056,856 B2* | 6/2006 | Summers et al. | 502/302 |
| 7,081,430 B2* | 7/2006 | Uenishi et al. | 502/327 |
| 7,202,194 B2* | 4/2007 | Muhammed et al. | 502/304 |
| 7,229,948 B2* | 6/2007 | Chigapov et al. | 502/327 |
| 7,314,846 B2* | 1/2008 | Kuno | 502/326 |
| 7,318,915 B2* | 1/2008 | Jordan et al. | 423/245.3 |
| 7,384,888 B2* | 6/2008 | Kuno | 502/326 |
| 7,390,768 B2* | 6/2008 | Jordan et al. | 502/326 |
| 7,943,104 B2* | 5/2011 | Kozlov et al. | 423/213.5 |
| 2002/0115563 A1* | 8/2002 | Blanchard et al. | 502/304 |
| 2003/0139290 A1* | 7/2003 | Jordan et al. | 502/344 |
| 2003/0144143 A1* | 7/2003 | Jordan et al. | 502/330 |
| 2005/0282698 A1 | 12/2005 | Southward et al. | |

FOREIGN PATENT DOCUMENTS

| | | |
|---|---|---|
| WO | 2004/035202 A1 | 4/2004 |
| WO | 2005/100249 A1 | 10/2005 |
| WO | 2005100249 | 10/2005 |
| WO | 2006030763 | 3/2006 |

OTHER PUBLICATIONS

Written Opinion of the International Searching Authority, dated Oct. 15, 2007.

EP1801074 is the English equivalent of, and attached to, WO2006030763. WO2006030763 is listed in the "Foreign Patent Documents" section of this IDS.

US20090185967 is the English equivalent of, and attached to, WO2005100249. WO2005100249 is listed in the "Foreign Patent Documents" section of this IDS.

European Examination Report for Application No. 07 732 859.9-1270, date Oct. 26, 2011.

* cited by examiner

OXYGEN STORAGE COMPONENT

The present invention relates to oxygen storage components for catalytic converters for automobile exhaust systems, particularly for those with petrol-driven engines.

In exhaust systems catalysts are required to remove by chemical reaction the main pollutants of carbon monoxide (CO), unburnt hydrocarbons (HC) and nitrogen oxides ($NO_x$) from car exhaust gases, and an oxygen storage component (OSC) is incorporated in such systems to extend the range of conditions of effective operation of the catalyst. The gases of a car exhaust vary from being "rich" (i.e. reducing conditions) to "lean" (i.e. oxidising conditions). Under rich conditions the oxygen required to oxidise the CO and HC components is provided by the OSC. When the system changes to lean conditions the OSC is oxidised by the gases so that it can again provide oxygen when rich conditions are encountered.

OSCs generally contain ceria and are commonly formed from a solid solution of ceria and zirconia with at least one other component, the ceria content normally being between 10% and 60% by weight. The OSC's performance under these oxidation and reduction conditions are often measured by Temperature Programmed Reduction (TPR) whereby a sample of OSC material is heated at a constant rate in a stream of reducing gas, such as hydrogen, and the amount of reaction effected by the sample monitored as a function of the gas stream composition. The TCD signal is a measure of the electrical current passing through the Thermal Conductivity Detector held in the gas stream. A high TCD value correlates with a high rate of consumption of hydrogen and thus a high rate of oxidation of the gas stream by the OSC. The main features of the TPR measurement are the temperature reached at the peak maximum of the reaction ($T_{max}$) and the area under the trace, which is proportional to the amount of the OSC that is reduced. There are other ways of measuring OSC performance, but we have found that when using TPR the typical value of $T_{max}$ for conventional OSCs is about 450-600° C. The exact value of $T_{max}$ for a given OSC is dependent on the exact composition of the OSC and the particular protocol of TPR used.

Temperatures of the order of 450°-600° C. are reached by the OSC during the normal operation of the exhaust catalyst, during which the OSC performs its required function of coping with changes in the exhaust gas composition from rich to lean and back again. However when a car engine is started from cold it takes some time for the catalyst to reach its normal operating temperature, and during this time the exhaust gases are not fully reacted by the catalyst before being discharged to the atmosphere. Recent legislation at least in the UK has changed the protocols for the testing of car emissions to include cold start conditions. As a result a number of ways to prevent the discharge of these partially unreacted emissions have been investigated. One option is to position the catalyst very near to the engine so that it heats up quickly. Another is electrically to heat the catalyst, whilst a third is to try to lower the light-off temperature of the catalyst. The light-off temperature is the temperature at which 50% of the incoming gases are converted to the more acceptable products. This can be achieved by altering the support and the dispersion of the PGM's (platinum group metals), which are generally the active catalysts. However this temperature is different for the three main pollutants being treated, and so it is difficult to find a good compromise combination of support and catalyst. An alternative approach is to try to reduce the $T_{max}$ of the OSC since this would also be useful in meeting the cold start regulations.

European patent no. 0588691 in the name of Rhone-Poulenc Chemie describes an OSC containing ceric oxide and an oxide of a metallic element selected from iron, bismuth, nickel, tin, chromium or one of their mixtures. The metallic element or elements are added in an amount of between 1% and 50% in order to improve the oxygen storage capacity of the ceria rather than to lower $T_{max}$.

It has been surprisingly found in the present invention that improved ceria-containing OSCs having reduced $T_{max}$ values can be obtained by adding significantly smaller amounts of one or more elements selected from the first row transition metals and group IVB elements of the periodic table than have been disclosed in the prior art. This improvement can be shown by TPR and is maintained over multiple redox cycles.

In accordance with the present invention there is provided a ceria containing mixed oxide suitable as an oxygen storage material having a ceria content in the range 10 to 80% by weight and at least one metal oxide in an amount of less than 0.5% by weight, wherein the metal is selected from the first row transition elements and the group IVB elements of the periodic table. The invention also provides an oxygen storage material for catalytic converters for automobile exhaust systems comprising an oxide of the present invention.

The ceria-containing mixed oxides includes one or more other oxides known to be used in OSCs such as aluminium and zirconia. Preferably the oxide is a ceria-zirconia mixed oxide. Preferably the ceria content is 20 to 60% by weight. The ceria-containing OSC may additionally contain one or more of yttria and the other rare earth elements in the range from 0 up to 20% by weight, preferably 5 to 15% by weight.

The improvement in the ceria-containing OSC is attained by adding to the OSC one or more elements selected from the first row transition metals and group IVB elements of the periodic table. This may be done at one or more of various stages of the manufacturing process, for example by adding them to the final OSC or to the washcoat. It is preferred to add the metal in the form of an aqueous salt and to do this under alkaline conditions. The addition is preferably carried out in a slurry with the OSC, preferably followed by filtering and washing steps. The filter cake is then preferably calcined.

If the one or more elements selected from the first row transition metals and group IVB of the periodic table are added to the final oxide, a lowering of $T_{max}$ can be seen during the first reduction cycle. If the one or more elements selected from the first row transition metals and group IVB of the periodic table are added during earlier stages of manufacture the full effect is only seen after two reduction cycles.

Figure 2:
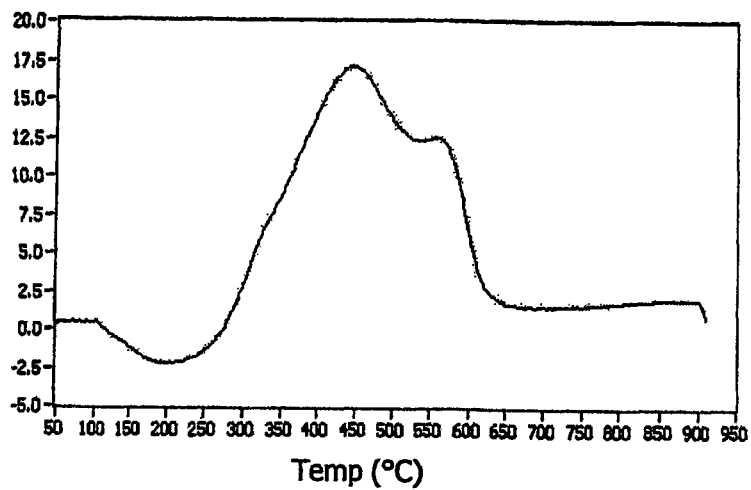
Figure 3:
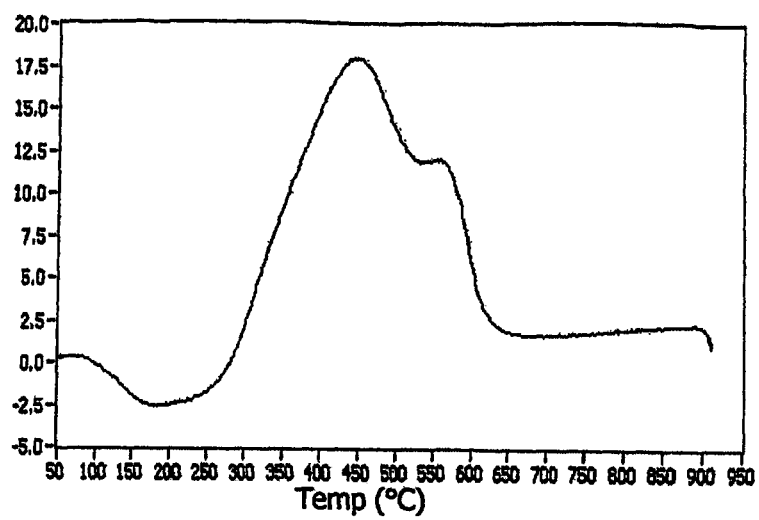
Figure 4:
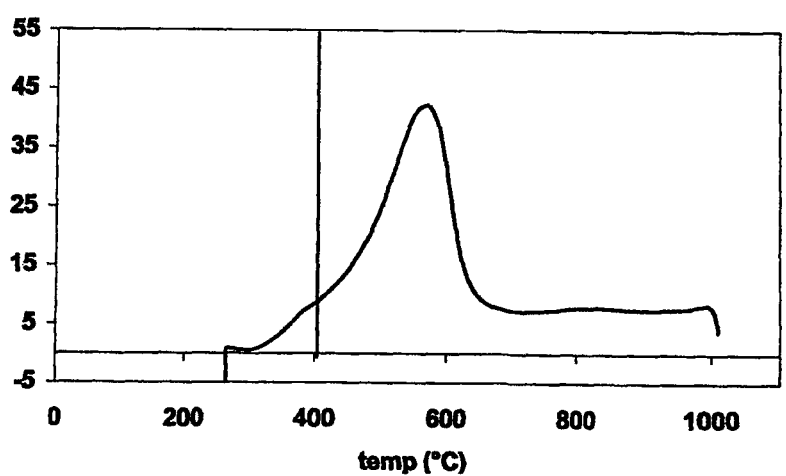
Figure 5:
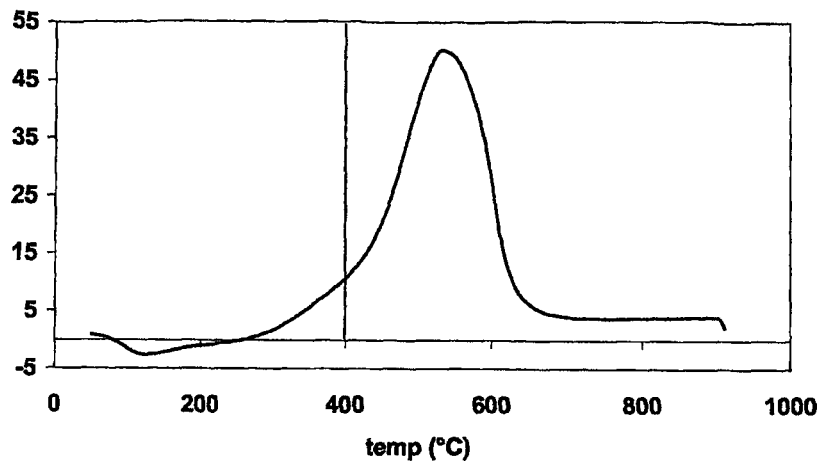
Figure 6:
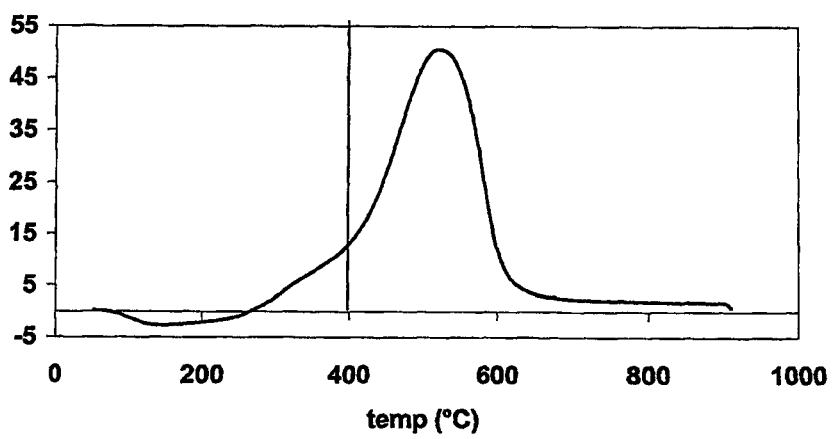

In the accompanying drawings:

FIG. 1 is a graph showing the TPR trace for a sample of an OSC material of the present invention during its first cycle, FIG. 2 is a graph showing the TPR trace for a sample of an OSC material of the present invention during its second cycle, FIG. 3 is a graph showing the TPR trace for a sample of an OSC material of the present invention during its third cycle, FIG. 4 is a graph showing a prior art OSC material during its first cycle, FIG. 5 is a graph showing a prior art OSC material during its second cycle, FIG. 6 is a graph showing a prior art OSC material during its third cycle.

The amount of one or more elements selected from the first row transition metals and group IVB of the periodic table to be added to the OSC should be greater than an impurity level (about 0.001 wt %) but less than 0.5% by weight and is preferably between 250 ppm and 2500 ppm (i.e. 0.025% to 0.25% by weight). The most preferred amount is about 1000 ppm (0.1% by weight). Addition above these levels has been found to have a detrimental effect on the surface area stability of the OSC after ageing at high temperatures.

The most preferred one or more elements selected from the first row transition metals and group IVB of the periodic table is tin.

The mixed oxide of the present invention can be made by known methods, with the additional one or more element being added in a suitable form at a suitable stage in the method. For example the method of WO 03/037506 can be used with the element being added as an aqueous solution of an ionic salt, such as chloride.

By producing a ceria-containing OSC as described above it is possible to achieve a reduction in $T_{max}$, as measured by TPR, and this reduction is maintained over multiple redox cycles. This lowering of $T_{max}$ is also stable over multiple redox cycles after the sample has been aged at high temperatures, for example 1100° C. The reduction in $T_{max}$ does not result in any significant detrimental effect to the other properties of the OSC, such as its surface area stability after high temperature ageing, or to the nature of its crystalline phase as measured by X-ray diffraction.

The present invention will now be exemplified by the following Examples which refer to the accompanying drawings, in which the TCD signal axis is graduated in arbitrary units or is left ungraduated since it is the shape of the TCD temperature profile which is significant.

EXAMPLE 1

400 g of a commercially available mixed oxide, containing ceria, zirconia, neodymia and lanthana, were slurried with 2000 ml of ammonia solution (10% by volume). To this was added a solution containing 0.84 g $SnCl_2.2H_2O$ dissolved in hydrochloric acid. After stirring, the mixture was filtered and washed well to remove chloride ions. The filter cake was then calcined at 550° C. for 1 hour to form an OSC.

Referring now to the accompanying drawings, FIGS. 1 to 6 show TCD temperature profiles for three cycles of TPR of ceria-containing OSCs. Each cycle involved heating the OSC up to 1000° C. under hydrogen gas. Each OSC was then re-oxidised at a lower temperature.

FIGS. 1 to 3 show the first three cycles, respectively, for the OSC of Example 1. FIGS. 4 to 6 show the first three cycles, respectively, for the OSC of Example 1 but to which tin had not been added. It can be clearly seen that the OSC of Example 1 which includes tin has a significantly lower $T_{max}$, than the OSC of Example 1 without tin. Furthermore FIGS. 1 to 3 show that this lowering of $T_{max}$ for the OSC of Example 1 is stable over multiple redox cycles.

EXAMPLES 2-9

Some samples of zirconium cerium hydroxide were prepared according to the method described in WO03/037506 but with variations at the stages where the hydroxide was washed, dried and calcined, the nature of the variation depending upon the stage at which the addition required by the present invention was made. The elemental composition of each sample was 47 wt % zirconia, 47 wt % ceria and 6 wt % other rare earths. Tin was added at different levels and at different stages in the method as set out below and in Table 1.

The hydroxide cake that was formed by the method (367.6 g, 27.2 wt % as oxide, equivalent to 100 g as oxide) was slurried in 400 g DIW (Deionised Water), the re-slurry having a pH of 11.9.

One of the stages in the method where the tin can be added is after the stage of adding caustic. For such "caustic stage addition" the tin solution is added to the suspension.

To this slurry 30% nitric acid was added, to bring the pH down to 8.0. The slurry was filtered and washed with 12 l of DIW at 60° C. The cake was then re-slurried in DIW.

Another stage at which the tin could be added is the stage of the washing of the hydroxide cake. For such a "washing stage addition", before the ammonia solution was added the tin solution was added, and then hydrogen peroxide added slowly, such that the temperature of the slurry did not rise above 40° C., the maximum observed being 37° C. The slurry was filtered and washed with 12 l DIW at 60° C. The cake was then re-slurried in DIW.

For either of the two alternative methods described above, the method continues as follows using the re-slurried cake. This slurry was first heated in a pressure vessel to 143° C. during a period of five hours and held at this temperature for a further five hours, equivalent to 3 barg.

Another stage at which the tin could be added is just prior to this heating stage. This stage is generally known as the "ITP stage". For such an "ITP stage addition" the tin solution is added prior to the start of the heating. For this variation the ammonia solution addition was as before, with hydrogen peroxide being added slowly, such that the temperature of the slurry did not rise above 40° C., the maximum observed being 37° C. The paste thus formed was calcined at 850° C. for two hours, ramped to temperature over 14 hours at 1° C./min., then allowed to cool at the natural rate. The oxide thus formed was crossbeaten milled through a 0.5 mm mesh.

A final stage at which the tin could be added is once the oxide is formed as described above. This is referred to as "oxide stage addition". The results of these examples are shown in Table 1.

EXAMPLES 10-19

For these Examples samples were prepared using the method as described in Example 1, and the details and results which are set out in Table 2 show the effect of variation in composition. Again the improvement when tin is present can be clearly seen.

In the Tables the following expressions are used:
TPR low T: This is the peak position (° C.) of the low temperature peak in the TPR on the named reduction cycle,
TPR high T: This is the equivalent high temperature peak,
TPR H2: This is the hydrogen uptake (μmoles/g) in the TPR on the named reduction cycle,
ASA 1000/4: This is the value of the surface area of the OSC after ageing at 1000° C. for 4 hours.
Where no figures are given either no measurable peak was detected or no data was recorded.

TABLE 1

| Example No | Stage | Nominal Sn level | $1^{st}$ Cycle TPR low T | 1st cycle TPR high T | $1^{st}$ cycle TPR $H_2$ | $2^{nd}$ cycle TPR low T | $2^{nd}$ cycle TPR high T | $2^{nd}$ cycle TPR$H_2$ | ASA 1000/4 |
|---|---|---|---|---|---|---|---|---|---|
| 2 (comparative) | Blank | 0 | — | 572 | 990 | — | 551 | 1000 | 32 |
| 3 | ITP | 250 | 400.0 | 571.0 | 685.9 | 359 | 554.5 | 1124 | 34 |

TABLE 1-continued

| Example No | Stage | Nominal Sn level | 1st Cycle TPR low T | 1st cycle TPR high T | 1st cycle TPR H$_2$ | 2nd cycle TPR low T | 2nd cycle TPR high T | 2nd cycle TPRH$_2$ | ASA 1000/4 |
|---|---|---|---|---|---|---|---|---|---|
| 4 | Oxide | 250 | 358.3 | 570.3 | 575.8 | 369 | 548.3 | 1157 | 34 |
| 5 | Oxide | 1000 | 380.8 | 583.5 | 365.8 | 341 | 557.6 | 1130 | 34 |
| 6 | Caustic | 2000 | 369.2 | 579.3 | 639.4 | 336 | 547.2 | 1047 | 25 |
| 7 | Washing | 2000 | 366.4 | 568.3 | 648.6 | 328 | 531.0 | 644 | 25 |
| 8 | ITP | 2000 | 400 | 578.7 | 686.9 | 333 | 559.9 | 1036 | 33 |
| 9 | Oxide | 2000 | 379.4 | 583.9 | 356.4 | 332 | 560.7 | 955 | 33 |

TABLE 2

| example | Tin addition | Zr | Ce | RE | 1st Cycle TPR low T | 1st cycle TPR high T | 1st cycle TPR H$_2$ | 2nd cycle TPR low T | 2nd cycle TPR high T | 2nd cycle TPR H$_2$ |
|---|---|---|---|---|---|---|---|---|---|---|
| 10 | N | 68 | 20 | 12 | | 570 | 610 | | 550 | 660 |
| 11 | Y | 68 | 20 | 12 | 246 | | 490 | 430 | 560 | 460 |
| 12 | Y | 60 | 30 | 10 | 480 | 610 | 670 | 470 | 580 | 750 |
| 13 | N | 52.5 | 37.5 | 10 | | 586 | 820 | | 570 | 780 |
| 14 | Y | 52.5 | 37.5 | 10 | 467 | 583 | 900 | 384 | 571 | 1030 |
| 15 | N | 50 | 40 | 10 | | 580 | 860 | | 560 | 870 |
| 16 | Y | 50 | 40 | 10 | 430 | 580 | | 330 | 567 | |
| 17 | N | 47.5 | 47.5 | 5 | | 590 | 960 | | 580 | 990 |
| 18 | Y | 47.5 | 47.5 | 5 | 348 | 588 | 1000 | | | |

The invention claimed is:

1. A ceria containing mixed oxide suitable as an oxygen storage material for a catalytic converter for an automobile exhaust system having a ceria content in the range of 20 to 48% by weight based on the weight of the mixed oxide, wherein the mixed oxide contains tin oxide in which tin is present in a total amount of from 0.025% to 0.2% by weight based on the weight of the mixed oxide.

2. An oxide as claimed in claim 1 wherein the mixed oxide further contains zirconia.

3. An oxide as claimed in claim 1 wherein the mixed oxide further contains one or more of yttria and an oxide of other rare earth elements in the range of up to 20% by weight, based on the total weight of the mixed oxide.

4. An oxide as claimed in claim 3 wherein the content of the one or more of yttria and the oxide of the other rare earth elements is from 5 to 15% by weight.

5. An oxide as claimed in claim 1 wherein said tin is present in an amount of about 0.1% by weight.

6. An oxygen storage material for a catalytic converter for an automobile exhaust system comprising an oxide as claimed in claim 1.

7. A catalytic converter for an automobile exhaust system including an oxygen storage material as claimed in claim 6.

* * * * *

UNITED STATES PATENT AND TRADEMARK OFFICE
CERTIFICATE OF CORRECTION

| | |
|---|---|
| PATENT NO. | : 8,414,835 B2 |
| APPLICATION NO. | : 12/301044 |
| DATED | : April 9, 2013 |
| INVENTOR(S) | : Heather Bradshaw and Colin Norman |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 236 days.

Signed and Sealed this
Ninth Day of July, 2013

Teresa Stanek Rea
*Acting Director of the United States Patent and Trademark Office*